United States Patent [19]
Parkison et al.

[11] 4,362,186
[45] Dec. 7, 1982

[54] SANITARY FITTING

[75] Inventors: Richard G. Parkison; Armin O. Fischer, both of Louisville, Ky.; John C. Kaussner, Easton, Conn.

[73] Assignee: American Standard Inc., New York, N.Y.

[21] Appl. No.: 233,419

[22] Filed: Feb. 11, 1981

[51] Int. Cl.³ .............................................. F16K 11/06
[52] U.S. Cl. .................... 137/625.17; 4/192; 137/360; 137/625.4
[58] Field of Search .............. 4/192; 137/360, 625.17, 137/625.4, 625.41

[56] References Cited

U.S. PATENT DOCUMENTS

| | | | |
|---|---|---|---|
| 3,433,264 | 3/1969 | Parkison | 137/625.17 |
| 3,736,959 | 6/1973 | Parkison | 137/625.17 |
| 3,823,737 | 7/1974 | Szymanski | 137/360 X |
| 4,243,063 | 1/1981 | Parkison | 137/625.41 X |

Primary Examiner—Gerald A. Michalsky
Attorney, Agent, or Firm—James J. Salerno, Jr.; Robert G. Crooks; John P. Sinnott

[57] ABSTRACT

A sanitary fitting of the type that is used to connect, in back-to-back relationship, a hot and cold water source without the necessity of crossing the pipe connections, is disclosed. The sanitary fitting includes a valve assembly which, when mounted in back-to-back relation with another sanitary fitting, the valving mechanism is arranged and constructed to reverse the flow of hot and cold water through the valve, so that the fitting can be operated in its normal mode, for example, when the handle is in the left-hand position, the hot water flows and, when the handle is in the right-hand position, cold water flows.

4 Claims, 6 Drawing Figures

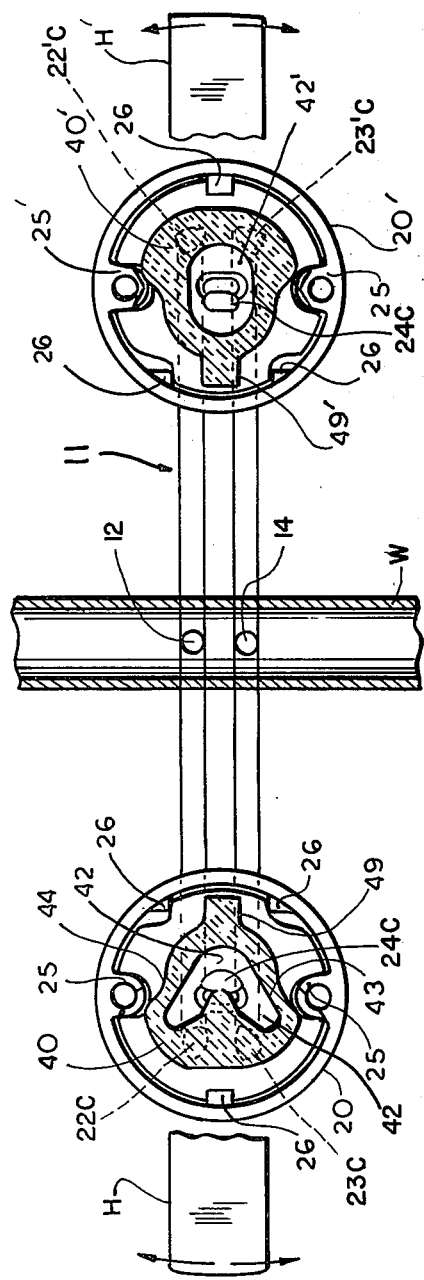
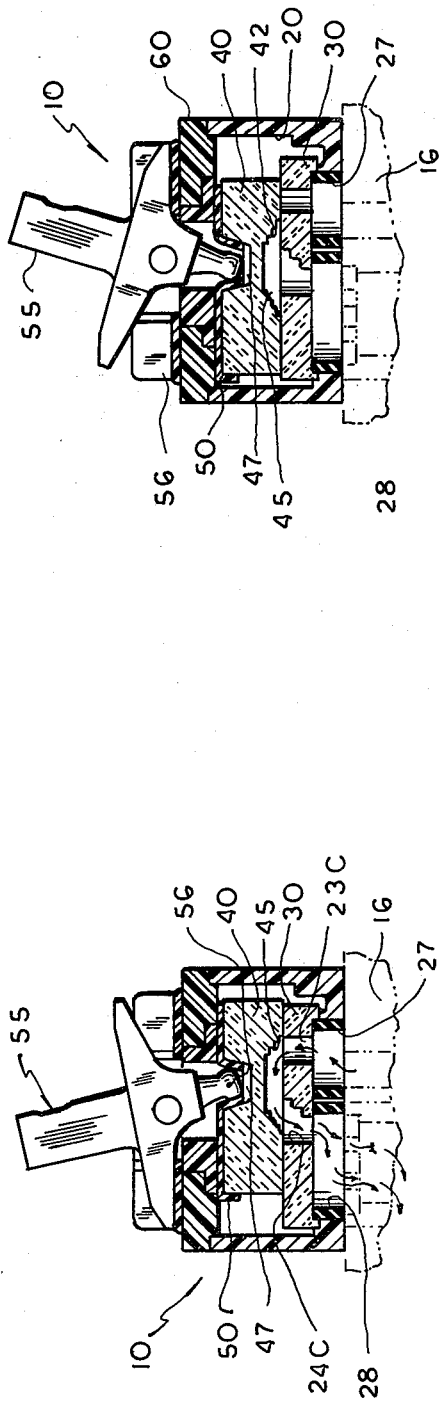
FIG. 3
FIG. 4A
FIG. 4B

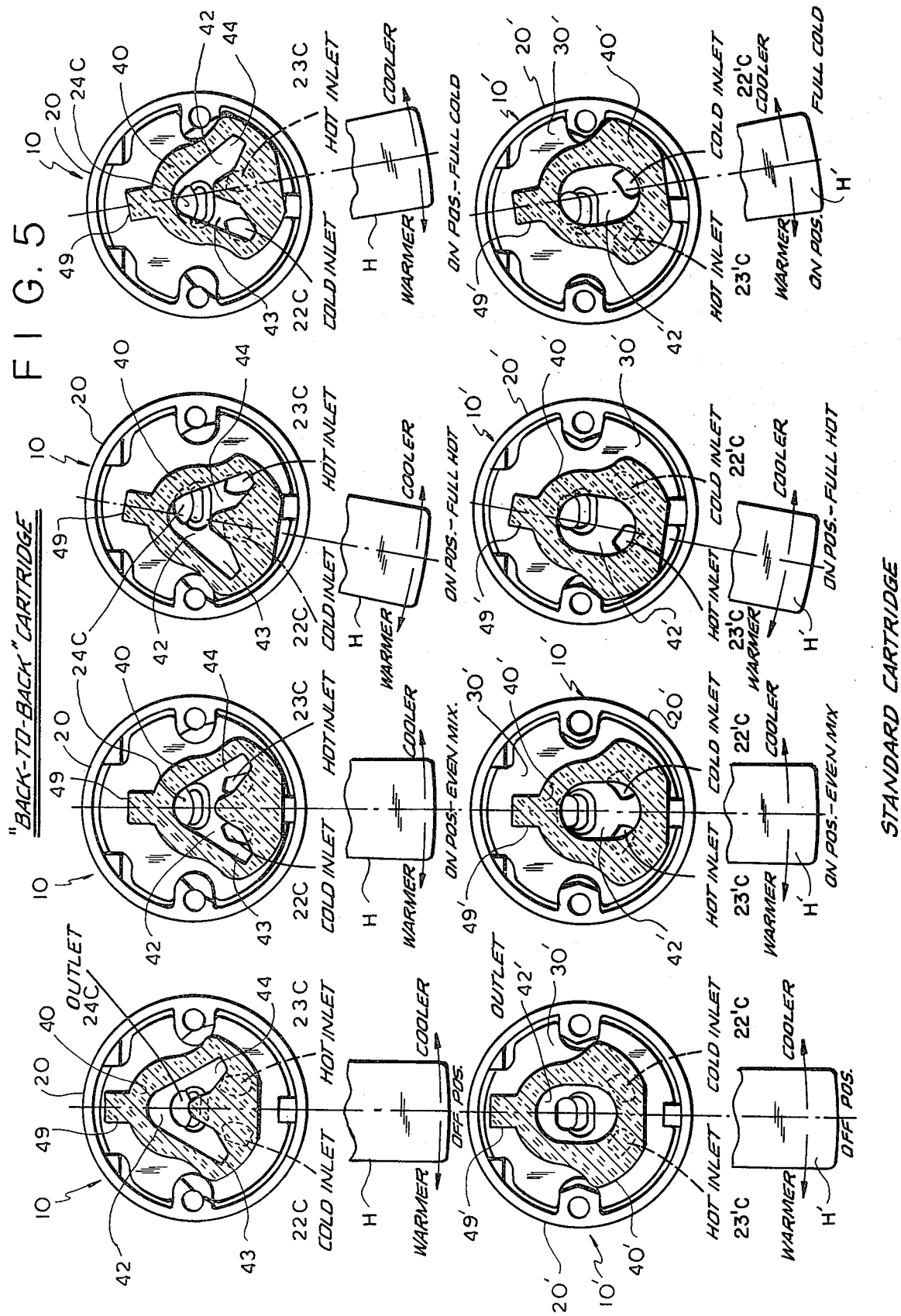

SANITARY FITTING

BACKGROUND OF THE INVENTION

1. Field of the Invention

This invention relates to an improved sanitary fitting in which the valving mechanism is arranged and constructed to reverse the flow of water through the valve, so that the sanitary fitting can be mounted in back-to-back relation with a conventional fitting, whereby both valving mechanisms can be attached to the common hot and cold water lines and the handle of each can be operated in the same normal manner without requiring additional plumbing.

2. Prior Art

Sanitary fitting assemblies have been used wherein standard faucet assemblies are adapted for mounting in back-to-back relation. For example, in U.S. Pat. No. 3,823,737, an adaptor is mounted on the manifold on which a conventional cartridge is mounted. The adaptor is arranged and constructed to eliminate additional piping required for so-called cross-over connections. In U.S. Pat. No. 3,583,004, a special manifold is provided wherein standard faucet assemblies can be mounted thereon, so that they will operate in back-to-back relation. In the former, the adaptor is mounted to the manifold which extends out from the wall, thereby requiring a different wall covering. In the latter, a specially-designed manifold is required which necessitates the stocking of special manifolds which are generally cast in brass; this leads to a more expensive sanitary fitting assembly. Also use of a special manifold may cause workman error when installing the manifold in the partition wall.

SUMMARY OF THE INVENTION

An object of the invention is to provide a sanitary fitting which is capable of being mounted in back-to-back relation with a conventional sanitary fitting, whereby additional plumbing is not required to properly orient the cold and hot water lines with respect to each fitting and to maintain the normal mode of handle operation.

It is another object of the invention to provide a sanitary fitting of the single control type, having a valving mechanism which permits the cross-over of cold and hot water flow through the valve, so that the sanitary fitting can be mounted in back-to-back relation to a conventional sanitary fitting.

Another object of the invention is to provide a sanitary fitting of the single control type, having a replaceable standard cartridge which may be exchanged for a cartridge having a valving mechanism with a cold and hot water cross-over means, so that said sanitary fitting may be used in back-to-back relation with a conventional sanitary fitting.

It is another object of the invention to provide a sanitary fitting of the back-to-back type which is relatively inexpensive, requires no additional plumbing and can be installed without the necessity of a specially designed manifold.

With the foregoing objectives in mind, the invention generally contemplates the provision of a valving mechanism, including cold and hot water cross-over means, for the internal reversal of water flow therein, so that the sanitary fitting may be mounted in back-to-back relation to a standard mounted sanitary fitting without the necessity of additional plumbing. The sanitary fitting is of the single control disc-valve type, having a stationary valve seat mounted in face-to-face contact with a shiftable valve plate. The shiftable valve plate includes a cold and hot water cross-over means having a bifurcated recess arranged and constructed so that when the valve plate is shifted to the left, the right arm of the recess will uncover the right water inlet opening to provide a reversal of water flow through the valving mechanism. Likewise, when the recess is shifted to the right, the left arm of the bifurcated stadium will uncover the left water inlet opening to provide a reversal of water flow through the valving mechanism.

BRIEF DESCRIPTION OF THE DRAWINGS

FIG. 3 is a schematic plan view in section with the valves of FIG. 1 rotated 90°, illustrating the valving mechanisms of the respective valve assemblies connected to a common cold and hot water line;

FIG. 4A is a side elevational view in section illustrating the water flow through the cold and hot water cross-over means of the valving mechanism of the present invention;

FIG. 4B is a side elevational view in section, similar to FIG. 4A, illustrating the valving mechanism of the present invention in its shut-off position;

FIG. 5 is a schematic representation in plan illustrating the various positions of the cold and hot water cross-over means of the valving mechanism of the present invention compared with a valve of standard design.

DESCRIPTION OF THE PREFERRED EMBODIMENT

Figure 1:
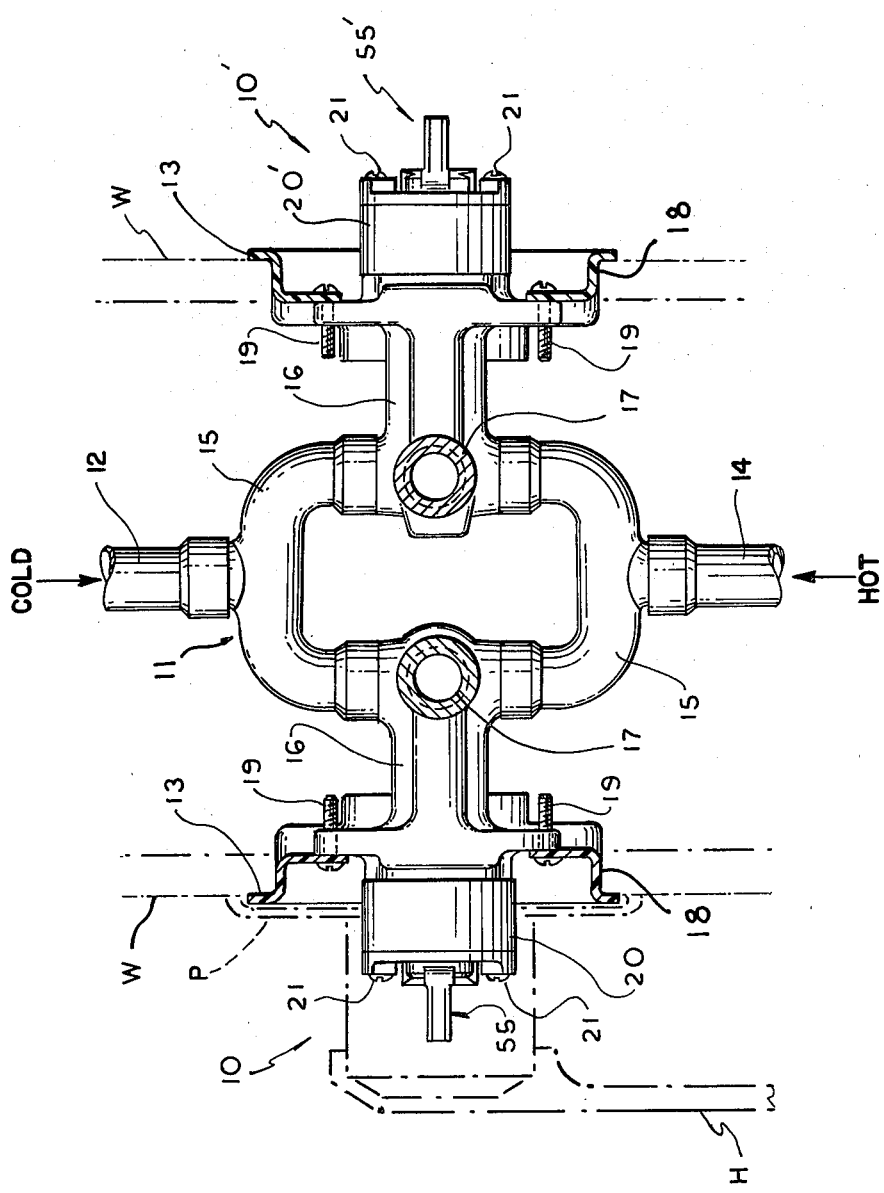
FIG. 1 is a top plan view illustrating the installation of a standard sanitary fitting on the right, and the sanitary fitting of the present invention mounted on the left, to the respective manifolds in back-to-back relation.

FIG. 1 illustrates the mounting of cartridge valve 10 of the present invention in back-to-back relation to a standard mounted cartridge valve 10', with both valves being coupled to common cold and hot water lines, 12 and 14 respectively. Cold water line 12 and hot water line 14 are respectively coupled by tees 15 of manifolds 16. Each manifold 16 has a shower connection 17 and a tub or bath connection, not shown. Piping 11 is located between a partition wall W, shown in dotted lines. A mounting cup 18 is coupled to manifold 16 by screws 19, so that the outer rim 13 of cup 18 is in alignment with the outer surface of wall W. When partition wall W is completed, cup 18 is removed, and escutcheon plate P shown in broken line in FIG. 1, is held to manifold 16 by threaded screws 19 and then handle H is mounted on actuator member 55. Valve 10 is mounted on manifold 16 by screws 21 in a watertight seal. In a similar fashion, valve 10' is mounted to manifold 16.

Figure 2:
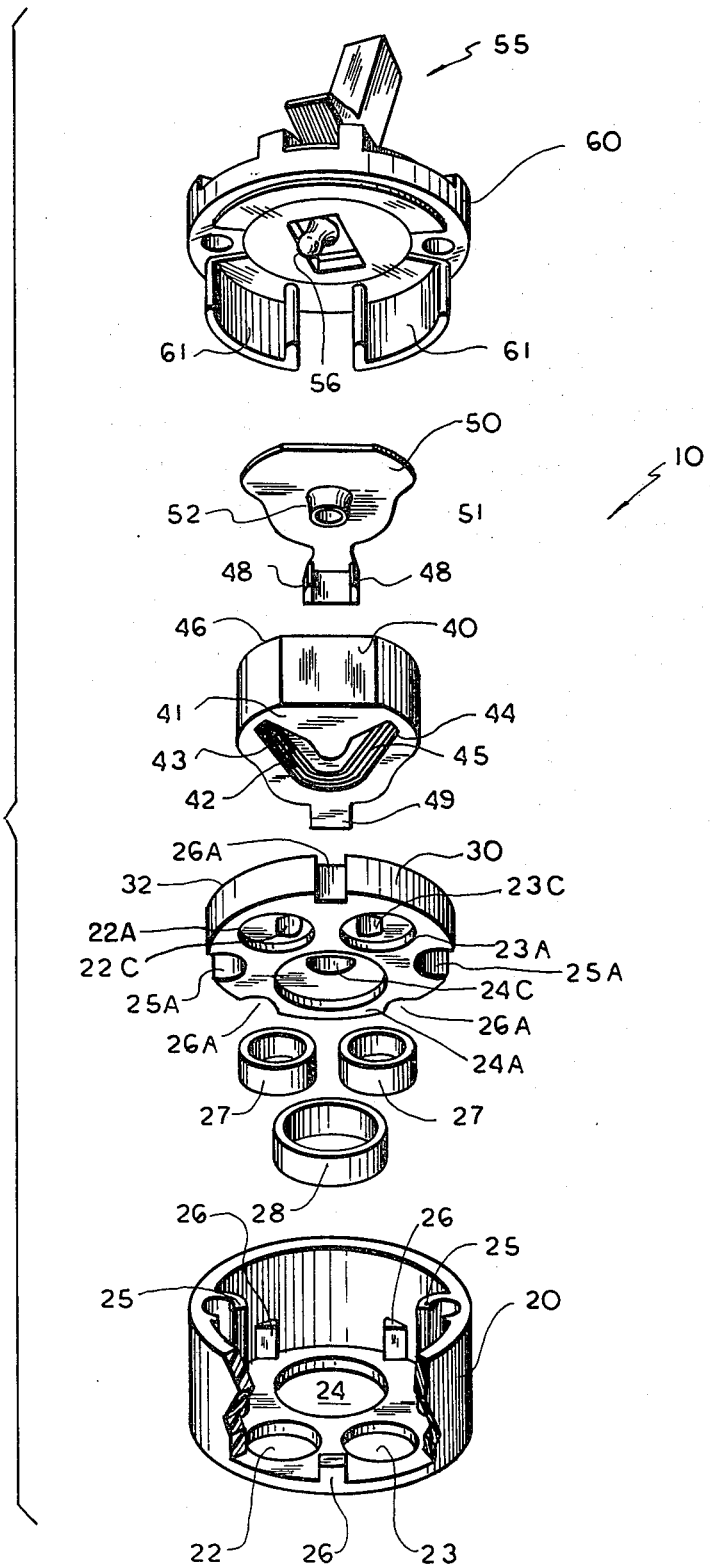
FIG. 2 is an exploded isometric view illustrating the various components of the valve assembly, including the cold and hot cross-over means of the valving mechanism, as viewed from the bottom with the casing partially broken away.

In FIG. 2, cartridge valve 10 is illustrated in exploded isometric form, showing how the elements forming the valving mechanism are sequentially coupled together. Casing 20 is provided with cold and hot water inlet ports 22 and 23 respectively, and an outlet port 24. Diametrically-opposed tubular sections 25 are formed integrally within casing 20 for cartridge-mounting screws 21 to pass through. Radially-positioned ribs 26 of casting 20 are spaced such that stationary disc 30 is mounted in fixed operative position by corresponding recesses or slots 25A, 26A, formed therein. Recesses 22A, 23A and 24A formed in the lower surface 31 or disc 30 are equally sized with ports 22, 23 and 24 of casing 20, to mount resilient O-rings 27 and larger O-ring 28 therein, to form a watertight seal between manifold 16 and casing 20, as shown in FIGS. 4A and 4B. Stationary disc 30 is also formed with cold and hot water openings 22C, 23C and water outlet opening 24C, which correspond to openings 22, 23 and 24 of casing 20. The top surface of stationary disc 30 is highly polished to form a stationary valve seat 32, shown in section in FIGS. 4A and 4B. Moveable valve plate 40 is formed having a polished surface 41 which nests in face-to-face contact with polished surface 32 or valve seat 30. Valve plate 40 includes a recess 42 and is shaped as a fanciful-expanded "U" to provide a bifurcated recess defining left and right elongated arms or sections 43, 44. Formed along the walls of recess 42 are a plurality of noise-reducing ridges 45 in the form of steps, which reduce the noise of the water, due to cavitation, as it flows through recess 42. In the top surface 46 of valve plate 40, a recess 47, centrally located, provides for subsequent mounting of the valve plate actuator member 55.

Plastic valve plate cover 50 is mounted on valve plate 40 and is held in place by clips 48 on tail 49. Valve plate cover 50 includes a central opening 51 formed by depending flange 52 which nests within opening 47 of valve plate 40. Valve plate cover 50 is shiftable with valve plate 40 by actuator member 55. Valve plate cover 50 reduces the wear to cover 60 and depending finger of actuating member 55 which would occur when valve plate 40 is shifted. Depending finger 56 of actuator member 55 is in the form of a ball and nests within opening 51 of flange 52 which provides a bearing surface to prevent wear of finger 56 against valve plate 40, and facilitates the orbital movement of valve plate 40. Cover 60 includes spaced, depending flanges 61, between which, tail 49 of valve plate 40 nests so that when actuator member 55 is rotated, valve plate 40 will also rotate. Cover 60 is sealed by casing 20 by ultrasonic welding to form a watertight, tamper-proof, replaceable cartridge valve 10, suitable for mounting on manifold 16. It is preferably that casing 20 and cover 60 be molded of the same plastic material, such as CELCON, sold by The Celanese Company, although other suitable plastic materials may be used. Stationary disc 30 and valve plate 40 are preferably made of ceramic, although other suitable materials may also be employed.

In FIG. 3, cartridge valves 10 and 10' are shown schematically mounted in back-to-back relation. Wall W is illustrated in section with cold and hot water lines 12 and 14 respectively shown as circles within wall W. Piping 11 is shown as parallel lines connecting cartridge valves 10 and 10' to the common cold and hot water lines 12 and 14 respectively without cross-over piping being required. Handles H and H' are shown broken away with arrows indicating the direction of movement of valve plates 40, 40', so that as handle H is moved to the left in the direction of the arrow, hot water inlet 23C will be uncovered by right arm 44 of bifurcated recess 42 to allow hot water to flow into recess 42 and out through outlet port 24C, thereby effecting an internal reversal of water within cartridge valve 10. In like manner, when handle H' is moved to the left in the direction of the arrow, hot water inlet 23C will be uncovered, allowing hot water to flow through recess 42' without a reversal of internal water flow.

In FIG. 4A, valve plate 40 is shown in its open position, illustrating the reversal of water flow through cartridge valve 10, the flow of water being in the direction of the arrows. In FIG. 4B, valve 10 is shown in its off or closed position.

The operation of cartridge valves 10 and 10' is best illustrated in FIG. 5 herein. FIG. 5 is a sectional view in plan of cartridges 10 and 10', mounted in back-to-back relation, wherein the various positions and movements of valve plates 40, 40' are illustrated in the off position, in the even-mix position, in the full hot position and in the full cold position. When valves 10 and 10' are in the full off position, both cold and hot water inlet openings 22C, 23C and 22'C, 23'C are covered respectively by polished surfaces 41, 41' of valve plates 40, 40' and handles H and H' are in the center mode position. When valves 10 and 10' are in the even-mix position, handles H and H' are in the center mode position and are raised vertically so that valve plates 40, 40' are shifted forward to uncover equal segments of cold and hot water inlet openings 22C, 23C, 22'C, 23'C respectively. When handle H is moved to the left, in the direction of the arrow indicating "warmer", hot water inlet opening 23C is uncovered by arm 44 of bifurcated recess 42 of valve plate 40. When handle H' of valve 10' is moved to the left in the direction of the arrow indicating "warmer", hot water inlet opening 23'C is uncovered, which is located on the left side of stationary valve plate 30'. Therefore valves 10' and 10 which are mounted in back-to-back relation, in operation both will open the respective hot water inlet openings 23'C and 23C when handles H' and H are moved to the left, even though the common hot water inlet openings for the respective valves are located on opposite sides. Thus it can be seen that back-to-back cartridge 10 effects the internal reversal of water flow as compared to standard cartridge 10'. In the final position illustrated in FIG. 5, handle H is moved to the right in the direction of the arrow, so that the cold water inlet opening 22C is uncovered by arm 43 of bifurcated recess 42 of valve plate 40, thus effecting an internal reversal of water flow through outlet opening 24C. When handle H' is moved to the right, in the direction of the arrow indicating "cooler", cold water inlet opening 22'C is uncovered.

What is claimed:

1. A sanitary fitting adapted to be mounted in back-to-back relation to a standard sanitary fitting on the opposite side of a partition wall with the handle operation unchanged, without requiring cross-over connections of the cold and hot water lines, said fitting comprising:

a stationary valve plate having first and second water inlet openings for conducting cold and hot water respectively therethrough and an outlet opening, said plate having a polished surface defining a valve seat;

a shiftable valve plate having means for effecting an internal reversal of water flow through said sanitary fitting, said means including a bifurcated recess formed therein and defining first and second arm sections, for communicating with said first and second water inlet openings respectively;

said shiftable valve plate having a polished surface and being mounted in face-to-face contact with said polished surface, of said stationary valve plate effecting a watertight seal therebetween; and a valve actuator means rotatably mounted on said sanitary fitting, and coupled to said shiftable valve plate, said actuator means being moveable along the vertical axis of said sanitary fitting for moving said shiftable valve plate rectilinearly so that at least one of said arm sections of said bifurcated recess uncovers said corresponding water inlet opening of said stationary valve plate and, when rotated, said other arm section of said bifurcated recess uncovers said other corresponding water inlet opening of said stationary valve plate.

2. The sanitary fitting of claim 1, wherein said stationary valve plate and said shiftable valve plate are made of ceramic material.

3. The sanitary fitting of claim 1, wherein said fitting includes a casing for housing said stationary and shiftable valve plates, and a cover for sealing said valve plates in operative position, said cover including an actuator arm coupled to said shiftable valve plate.

4. A replaceable cartridge valve for a sanitary fitting having a valving mechanism with a cold and hot water cross-over means which is adapted to be mounted in back-to-back relation to a standard sanitary fitting on the opposite side of a partition wall, with the mode of handle operation unchanged, and without requiring cross-over connections of the cold and hot water lines, said replaceable cartridge valve comprising:

a casing having first and second water inlet openings and an outlet opening at one end, and open at the other end thereof;

a cover for closing said open end of said casing;

a stationary valve plate mounted in said casing and having first and second water inlet openings for conducting cold and hot water respectively therethrough and a water outlet opening, and being aligned with said first and second inlet and outlet casing openings, said valve plate having a polished surface defining a valve seat;

a shiftable valve plate having means for effecting an internal reversal of water flow through said sanitary fitting, said means including a bifurcated recess formed therein and first and second arm sections for communicating with said first and second water inlet openings respectively of said stationary valve plate and said casing;

said shiftable valve plate having a polished surface and being mounted in face-to-face contact with said polished surface of said stationary valve plate to effect a watertight seal therebetween; and valve actuator means rotatably mounted in said cover and coupled to said shiftable valve plate, said valve actuator means being moveable along the vertical axis of said casing for moving said shiftable valve plate rectilinearly so that at least one of said arm sections of said bifurcated recess uncovers said corresponding water inlet opening of the stationary valve plate and, when rotated, said other arm section of said bifurcated recess uncovers said other corresponding water inlet opening of the stationary valve plate.

* * * * *